US012631805B2

(12) United States Patent
Kuo et al.

(10) Patent No.: US 12,631,805 B2
(45) Date of Patent: May 19, 2026

(54) OPTICAL COMPONENT, BACKLIGHT MODULE AND DISPLAY DEVICE

(71) Applicants:Radiant Opto-Electronics (Suzhou) Co., Ltd., Jiangsu (CN); Radiant Opto-Electronics Corporation, Kaohsiung (TW)

(72) Inventors: Yu-Hao Kuo, Kaohsiung (TW); Yi-Shan Lin, Kaohsiung (TW); Ching-Chieh Yeh, Kaohsiung (TW)

(73) Assignees: Radiant Opto-Electronics (Suzhou) Co., Ltd., Jiangsu (CN); Radiant Opto-Electronics Corporation, Kaohsiung (TW)

( * ) Notice: Subject to any disclaimer, the term of this patent is extended or adjusted under 35 U.S.C. 154(b) by 288 days.

(21) Appl. No.: 18/544,380

(22) Filed: Dec. 18, 2023

(65) Prior Publication Data

US 2024/0295680 A1     Sep. 5, 2024

Related U.S. Application Data

(63) Continuation of application No. PCT/CN2023/088898, filed on Apr. 18, 2023.

(30) Foreign Application Priority Data

Mar. 3, 2023     (CN) .......................... 202310197241.9

(51) Int. Cl.
G02B 5/18                    (2006.01)
(52) U.S. Cl.
CPC ......... G02B 5/1814 (2013.01); G02B 5/1866 (2013.01)

(58) Field of Classification Search
None
See application file for complete search history.

(56) References Cited

U.S. PATENT DOCUMENTS

2015/0268399 A1* 9/2015 Futterer .............. G02B 6/0076
                                                              362/606
2019/0212492 A1* 7/2019 Meng .................... G02B 6/122

FOREIGN PATENT DOCUMENTS

| | | |
|---|---|---|
| CN | 101196583 A | 6/2008 |
| CN | 101512413 A | 8/2009 |
| CN | 108227277 A | 6/2018 |
| CN | 108562965 A | 9/2018 |
| CN | 109541738 A | 3/2019 |
| CN | 114730026 A | 7/2022 |
| CN | 115602781 A | 1/2023 |
| JP | 2007087647 A | 4/2007 |
| JP | 2009237357 A | 10/2009 |
| KR | 20100091376 A | 8/2010 |

(Continued)

*Primary Examiner* — Ryan Crockett
(74) *Attorney, Agent, or Firm* — CKC & Partners Co., LLC

(57)     ABSTRACT

An optical component includes a transparent substrate, a first volume grating and a second volume grating disposed on the transparent substrate. The transparent substrate is located between the first volume grating and the second volume grating. The first volume grating has a plurality of first diffraction elements arranged in rectangular array, while the second volume grating has a plurality of second diffraction elements arranged in rectangular array. In addition, the spacing between two adjacent first diffraction elements is larger than the spacing between two adjacent second diffraction elements.

17 Claims, 5 Drawing Sheets

10

120

100

140

142

122

(56)         References Cited

FOREIGN PATENT DOCUMENTS

| TW | 201035640 | A | 10/2010 |
| TW | 202101034 | A | 1/2021 |
| WO | 2022/232820 | A1 | 11/2022 |

* cited by examiner

400

50

OPTICAL COMPONENT, BACKLIGHT MODULE AND DISPLAY DEVICE

RELATED APPLICATIONS

This application is a continuation of International application No. PCT/CN2023/088898, filed on Apr. 18, 2023, which claims priority from China Patent Application Serial Number 202310197241.9, filed on Mar. 3, 2023, the content of which are incorporated herein by reference in their entireties.

BACKGROUND

Technical Field

The present disclosure relates to an optical component, a backlight module and a display device. More particular, the present disclosure relates to the optical component which includes diffraction structures, and also relates to the backlight module and the display device including this optical component.

Description of Related Art

In present, light emitting diodes (LEDs) are used as light sources of display devices. Those display devices are usually equipped with at least one component for light uniformity, for example, with a diffuser to uniform the light, so that the light from the LEDs may be emitted uniformly. However, the light uniformity through the diffuser is achieved by light scattering under geometrical optics, so that the light loss is large. In addition, due to the specific thicknesses of the geometrical optics films (such as the diffusers), the displays using the geometrical optics films for light uniformity are limited to be lighter or thinner.

SUMMARY

Accordingly, an object for the disclosure is to provide an optical component, and the surface structures of this optical component may improve light uniformity and luminance.

At least one embodiment of the disclosure provides an optical component. The optical component includes a transparent substrate, a first volume grating and a second volume grating. The first volume grating is disposed on the transparent substrate and includes a plurality of first diffraction elements which are arranged in rectangular array. The second volume grating is disposed on the transparent substrate which is located between the first volume grating and the second volume grating. The second volume grating includes a plurality of second diffraction elements which are spaced from each other and arranged in rectangular array. The spacing between two of the plurality of second diffraction elements adjacent to each other is larger than the spacing between two of the plurality of first diffraction elements adjacent to each other.

At least in one embodiment of the disclosure, a monochromatic light having a wavelength $\lambda$ ranging from 380 nm to 780 nm enters the first volume grating having a refractive index n1 and a thickness T1. The spacing between two of the plurality of first diffraction elements adjacent to each other which is defined as d1 satisfies the inequality:

$$\frac{n1 d1^2}{T1} \leq 2\pi\lambda.$$

At least in one embodiment of the disclosure, the spacing d1 between two of the plurality of first diffraction elements adjacent to each other satisfies the inequality: 380 nm$\leq$d1$\leq$780 nm.

At least in one embodiment of the disclosure, a phase retardation angle $\theta$ of the monochromatic light satisfies the inequality:

$$\frac{n\lambda}{2} \leq d1 \, \sin\theta,$$

and the n within the inequality is a positive integer.

At least in one embodiment of the disclosure, the second volume grating has a refractive index n2 and a thickness T2. The spacing between two of the plurality of second diffraction elements adjacent to each other which is defined as d2 satisfies the inequality:

$$\frac{n2 d2^2}{T2} \leq 2\pi\lambda.$$

At least in one embodiment of the disclosure, the spacing d2 between two of the plurality of second diffraction elements adjacent to each other satisfies the inequality: 780 nm$\leq$d2$\leq$10000 nm.

At least in one embodiment of the disclosure, the spacing d2 between two of the plurality of second diffraction elements adjacent to each other is less than 27 times of the spacing d1 between two of the plurality of first diffraction elements adjacent to each other.

At least in one embodiment of the disclosure, a thickness of the first volume grating is less than 0.1 mm.

At least in one embodiment of the disclosure, a thickness of the second volume grating is less than 0.1 mm.

At least in one embodiment of the disclosure, a refractive index of the first volume grating is higher than a refractive index of the transparent substrate. The refractive index of the transparent substrate is higher than a refractive index of the second volume grating.

At least in one embodiment of the disclosure, a refractive index of the transparent substrate, a refractive index of the first volume grating and a refractive index of the second volume grating range from 1.4 to 1.7.

At least in one embodiment of the disclosure, the plurality of first diffraction elements are coplanar.

At least in one embodiment of the disclosure, the plurality of second diffraction elements are coplanar.

At least in one embodiment of the disclosure, the second volume grating further includes a plurality of concave surfaces which are arranged in rectangular array and connected to each other. A plurality of convex sections are formed on the edges of the plurality of concave surfaces, and the plurality of convex sections are identical to the plurality of second diffraction elements.

At least in one embodiment of the disclosure, four of the plurality of convex sections are located on the edges of each of the plurality of concave surfaces.

At least in one embodiment of the disclosure, each of the plurality of first diffraction elements is a convex structure or a concave structure.

Another embodiment of the disclosure provides a backlight module including the optical component and a monochromatic light source which is used to emit the monochromatic toward the first volume grating.

Another embodiment of the disclosure provides a display device including the backlight module and a display panel which is disposed opposite to the backlight module.

Accordingly, the disclosure applies the volume grating of the optical component to diffract the incident monochromatic light, thereby improving the light uniformity and luminous efficiency (i.e. luminance) of the light emitted by the light source. Furthermore, since the optical component can make the light uniform without the diffusers, the cost of the diffusers is saved, and the thickness of the optical component is reduced.

BRIEF DESCRIPTION OF THE DRAWINGS

To illustrate more clearly the aforementioned and the other objects, features, merits, and embodiments of the present disclosure, the description of the accompanying figures are as follows.

DETAILED DESCRIPTION

Figure 1:
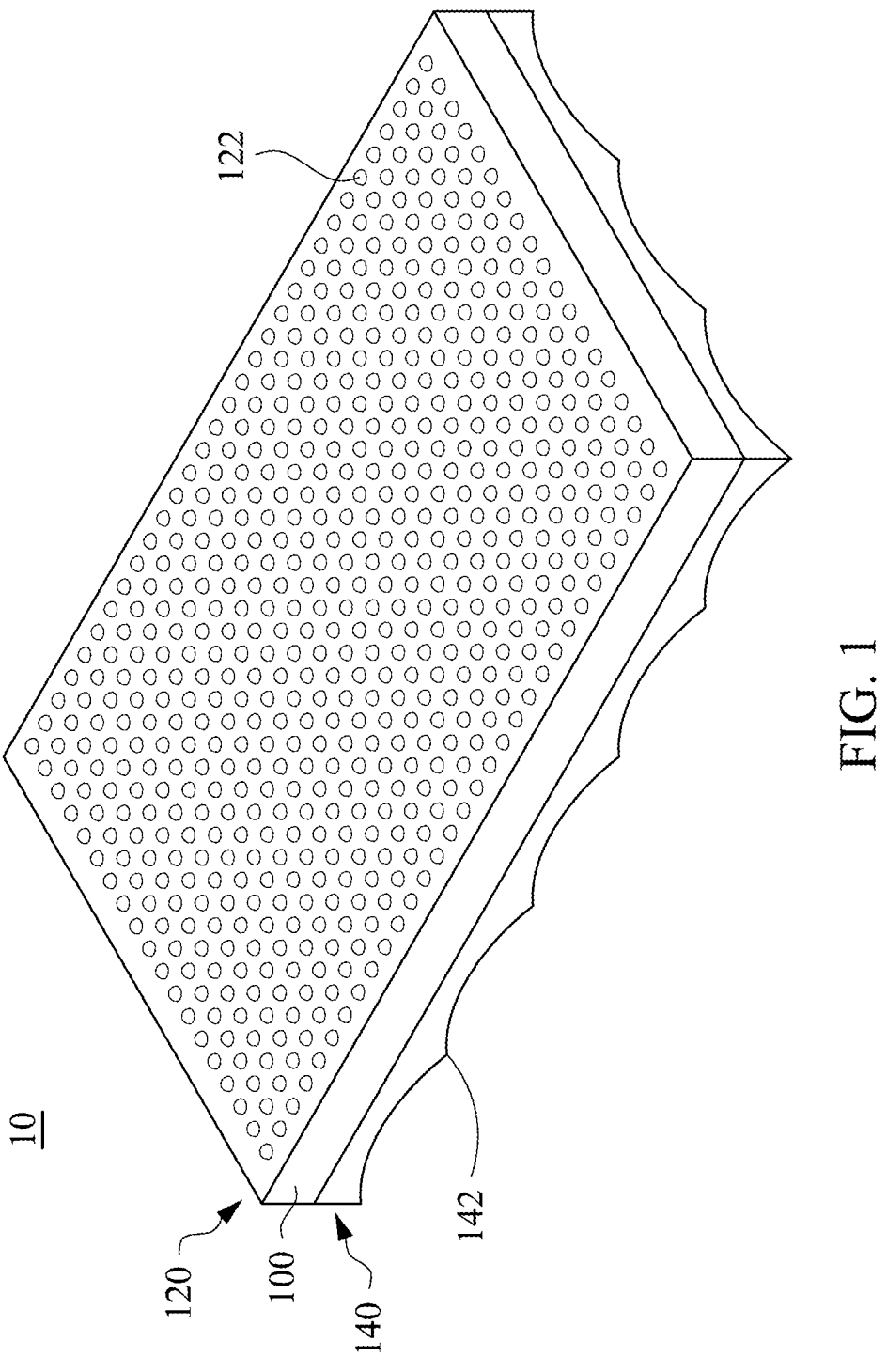
FIG. 1 illustrates a stereographic view of an optical component in accordance with at least one embodiment of the present disclosure.

In the following description, the dimensions (such as lengths, widths and thicknesses) of components (such as layers, films, substrates and regions) in the drawings are enlarged not-to-scale, and the number of components may be reduced in order to clarify the technical features of the disclosure. Therefore, the following illustrations and explanations are not limited to the number of components, the number of components, the dimensions and the shapes of components, and the deviation of size and shape caused by the practical procedures or tolerances are included. For example, a flat surface shown in drawings may have rough and/or non-linear features, while angles shown in drawings may be circular. As a result, the drawings of components shown in the disclosure are mainly for illustration and not intended to accurately depict the real shapes of the components, nor are intended to limit the scope of the claimed content of the disclosure.

Further, when a number or a range of numbers is described with "about," "approximate," "substantially," and the like, the term is intended to encompass numbers that are within a reasonable range considering variations that inherently arise during manufacturing as understood by one of ordinary skill in the art. In addition, the number or range of numbers encompasses a reasonable range including the number described, such as within +/−5%, +/−3% or +/−1% of the number described, based on known manufacturing tolerances associated with manufacturing a feature having a characteristic associated with the number. The words of deviations such as "about," "approximate," "substantially," and the like are chosen in accordance with the optical properties, etching properties, mechanical properties or other properties. The words of deviations used in the optical properties, etching properties, mechanical properties or other properties are not chosen with a single standard.

Figure 2A:
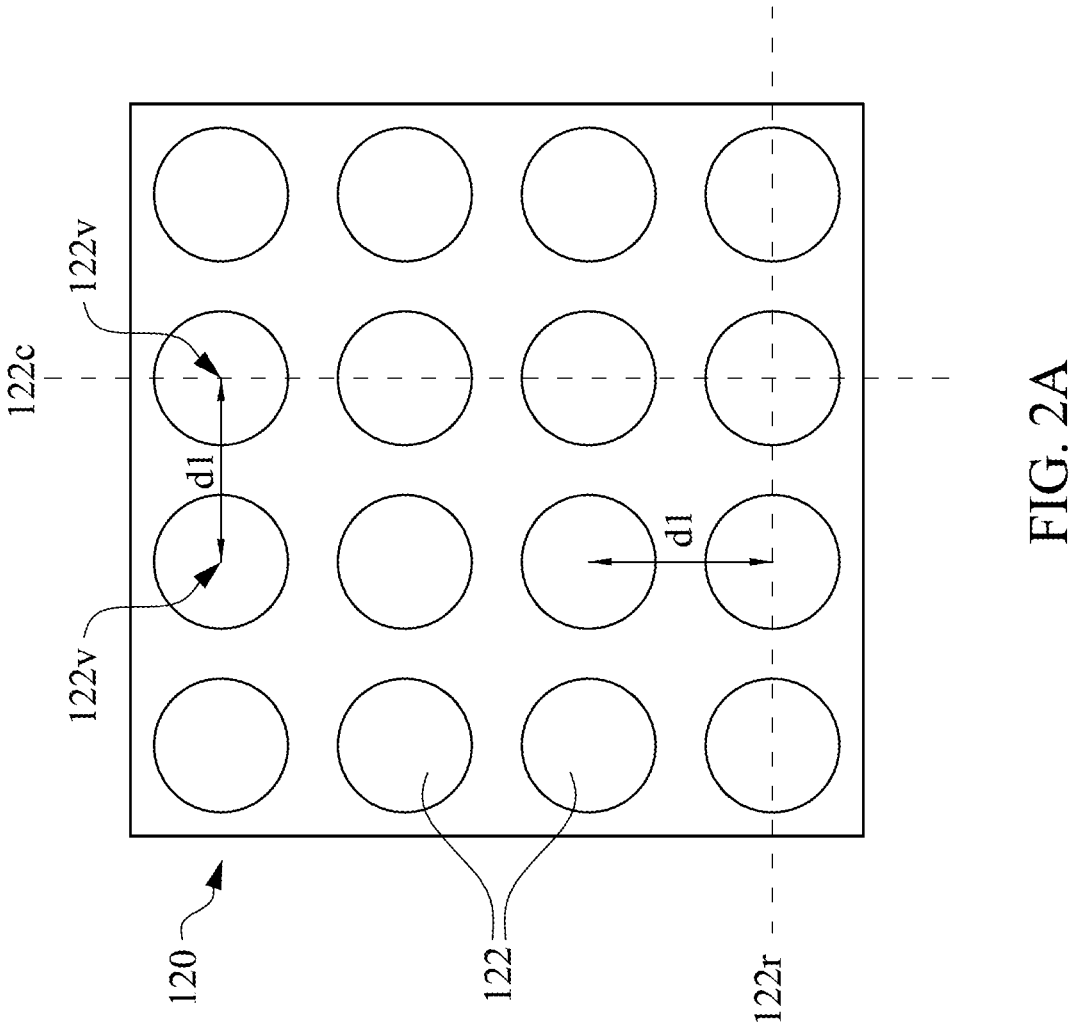
FIG. 2A illustrates a locally view of an optical component in accordance with at least one embodiment of the present disclosure.
Figure 2B:
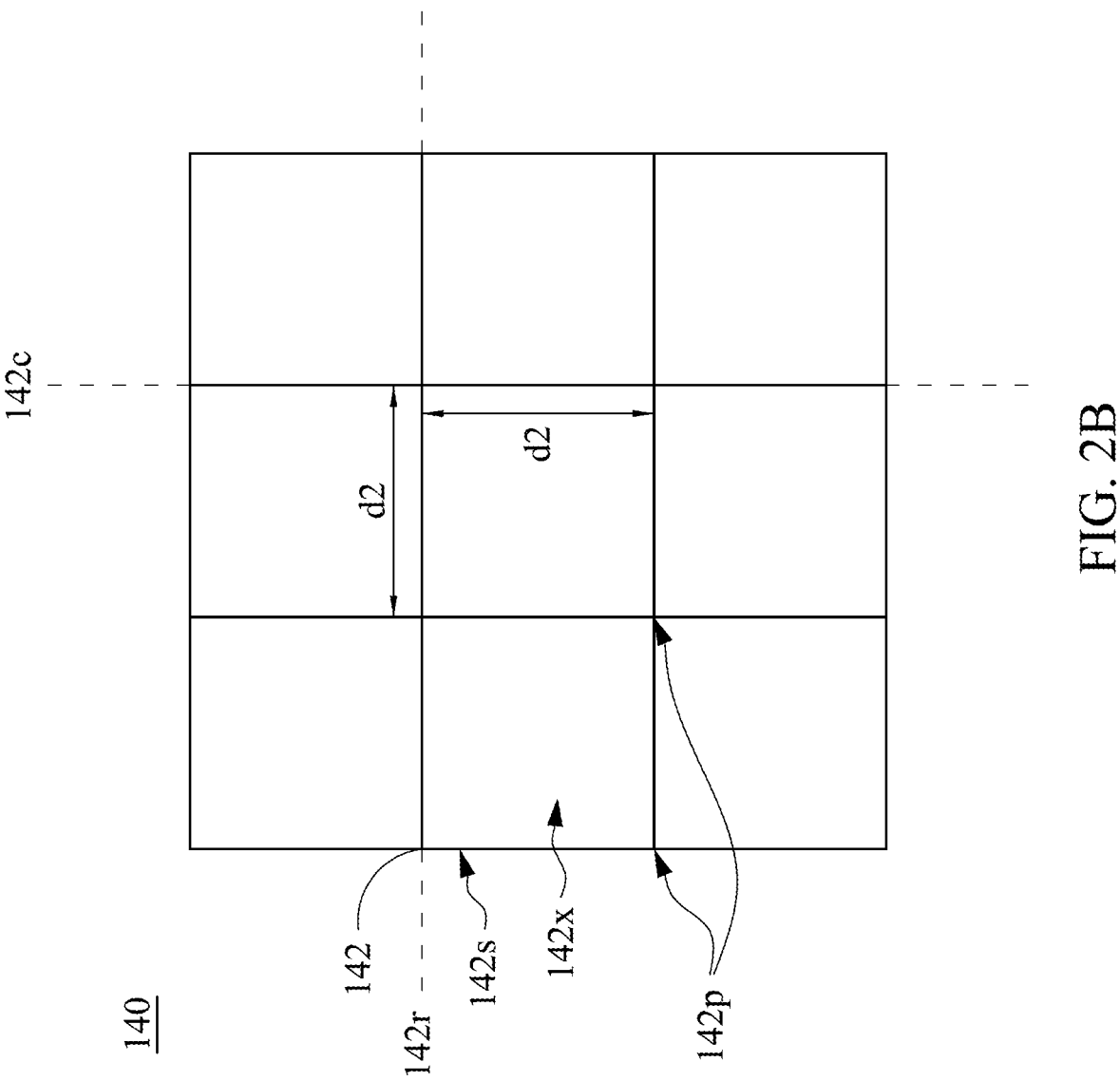
FIG. 2B illustrates a locally view of an optical component in accordance with at least one embodiment of the present disclosure.
Figure 3:
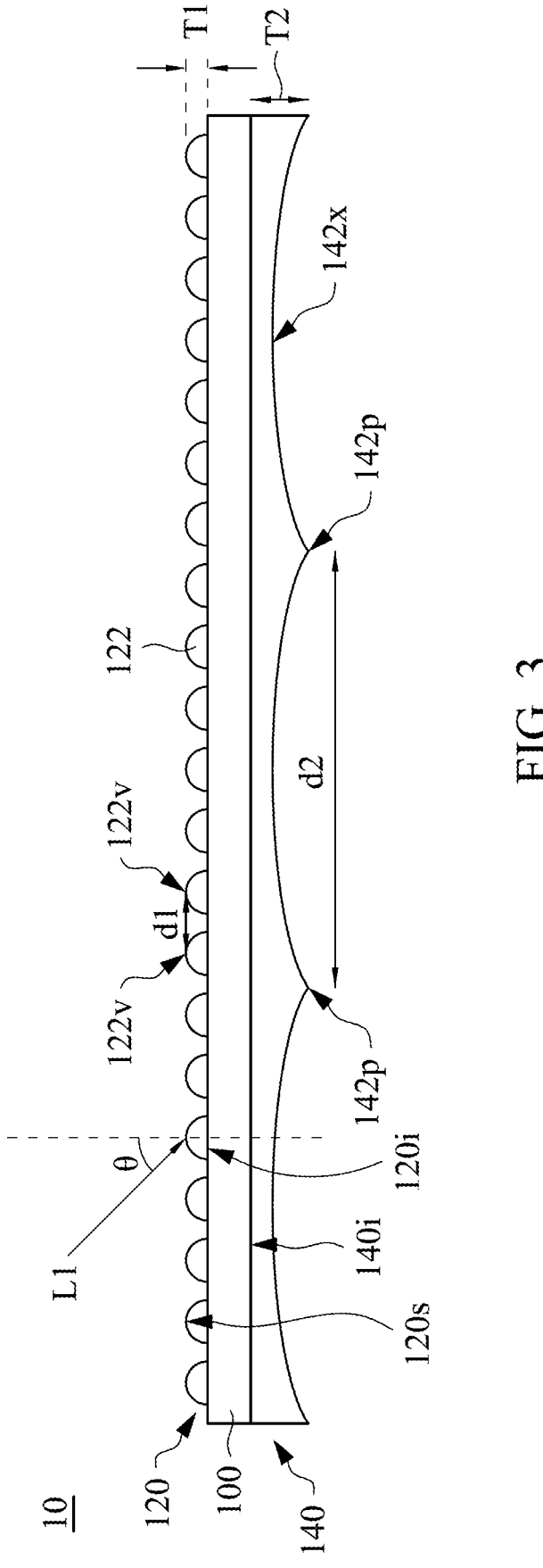
FIG. 3 illustrates a side view of an optical component in accordance with at least one embodiment of the present disclosure.

Referring to FIG. 1 to FIG. 3, an optical component 10 includes a transparent substrate 100, a first volume grating 120 and a second volume grating 140. The first volume grating 120 and the second volume grating 140 are disposed on the transparent substrate 100 and located on two sides of the transparent substrate 100 separately. That is, the transparent substrate 100 is located between the first volume grating 120 and the second volume grating 140. Specifically, the first volume grating 120 of the optical component 10 works as the light incident surface to receive light emitted from light sources, while the second volume grating 140 works as the light exiting surface to provide uniform light.

As shown in FIG. 2A, the first volume grating 120 includes a plurality of first diffraction elements 122, and these plurality of first diffraction elements 122 are arranged in rectangular array. The rectangular array in this disclosure is defined as an arrangement of objects into equidistant columns and equidistant rows that form a rectangle. For example, the spacing between two adjacent columns 122c where the plurality of first diffraction elements 122 are arranged is defined as spacing d1, while the spacing between two adjacent rows 122r where the plurality of first diffraction elements 122 are arranged is also defined as spacing d1 in this embodiment.

As shown in FIG. 2B, the second volume grating 140 includes a plurality of second diffraction elements 142. The plurality of second diffraction elements 142 are spaced from each other and arranged in rectangular array. The spacing between two adjacent rows 142c where the plurality of second diffraction elements 142 are arranged is defined as spacing d2, while the spacing between two adjacent rows 142r where the plurality of second diffraction elements 142 are arranged is also defined as spacing d2. In the embodiment, the spacing d2 between two of the plurality of second diffraction elements 142 adjacent to each other is larger than the spacing d1 between two of the plurality of first diffraction elements 122 adjacent to each other.

Referring to FIG. 3, monochromatic light L1 enters the first volume grating 120 through a surface 120s of the first volume grating 120. In order to make the monochromatic light L1 perform wave front division through the plurality of first diffraction elements 122 of the first volume grating 120 and to increase the light coherency which leads the monochromatic light L1 to be diffracted by the first volume grating 120 according to Huygens-Fresnel principle, the spacing d1 between the plurality of first diffraction elements 122 is approximate to the wavelength of the monochromatic light L1. On the other hand, when the monochromatic light L1 passes through the transparent substrate 100 and enters the second volume grating 140, refraction and reflection of the light may occur at the interface (such as the interface 120i and the interface 140i), and then results in amplitude division. Amplitude division may also increase the light coherency, and thus the diffraction of the monochromatic light L1 increases. The luminance of the optical component 10 is increased due to the increase of the diffraction.

However, through the aforementioned interference, the monochromatic light L1 performs obvious interference fringes which make the light be emitted without uniformity. Thus, the plurality of second diffraction elements 142 of the second volume grating 140 are used as an amplitude diffraction grating which regulates the amplitude of constructive interference, so that the amplitude difference between bright and dark fringes in the interference fringes is decreased, thereby making the emitted light more uniform. Furthermore, the spacing d1 between the plurality of first diffraction elements 122 collocates the spacing d2 between the plurality of second diffraction elements 142, while the spacing d2 between the plurality of second diffraction elements 142 is larger than the spacing d1 between the plurality of first diffraction elements 122. For example, the wider the between grating spacing, the less concentrated the amplitude of constructive interference under multi-slit diffraction. As a result, the interference fringes can be shielded even though the diffraction is increased, and thus the light uniformity is improved.

Compared to typical geometrical optics films, the disclosure applies the principle of diffraction grating under diffractive optics. The volume diffraction gratings (i.e., the first volume grating 120 and the second volume grating 140) are disposed on the light incident surface and the light exiting surface, and the diffraction of monochromatic light is performed to increase the light uniformity and luminance.

In the embodiment, a wavelength λ of the monochromatic light L1 ranges from 380 nm to 780 nm. The first volume grating 120 has a refractive index n1 and a thickness T1. The refractive index n1, the thickness T1 and the spacing d1 between two of the plurality of first diffraction elements 122 adjacent to each other satisfies the inequality:

$$\frac{n1d1^2}{T1} \leq 2\pi\lambda.$$

According to Klein-Cook grating parameter theory, when the light entering a grating has Klein-Cook parameter Q and satisfies Q≥1, the light exiting from the grating is prone to perform a diffraction which has similar orders in intensity. The calculation of Klein-Cook parameter Q is according to the equation:

$$Q = \frac{2\pi\lambda T}{nd^2}.$$

The wavelength λ in this equation represents the wavelength of the light, and it may represent the peak wavelength or the center wavelength. The T represents the thickness of the grating, while the d represents the spacing of the diffraction elements of the grating. The n represents the refractive index of the grating. In order to perform the diffraction which has similar orders in intensity, so that the light is uniformed, the monochromatic light L1 and the first volume grating 120 of this embodiment should satisfy Q≥1. Thus, the inequality in the previous paragraph is obtained by substituting the equation for Klein-Cook parameter Q.

In the embodiment, the spacing d1 between two of the plurality of first diffraction elements 122 adjacent to each other ranges from 380 nm to 780 nm. In other words, the spacing d1 satisfies the inequality: 380 nm≤d1≤780 nm. On the other hand, the thickness T1 of the first volume grating 120 is less than 0.1 mm, while the refractive index n1 ranges from 1.4 to 1.7. It is worth mentioning, the thickness T1 of the first volume grating 120 is equivalent to the thickness of the plurality of first diffraction elements 122 as shown in FIG. 3. When the refractive index n1, the thickness T1 of the first volume grating 120 and the spacing d1 between two of the plurality of first diffraction elements 122 adjacent to each other are limited to aforementioned ranges, the thickness T1 of the first volume grating 120 must be less than 0.1 mm to satisfy the inequality:

$$\frac{n1d1^2}{T1} \leq 2\pi\lambda.$$

In addition, the monochromatic light L1 has a phase retardation angle θ. This phase retardation angle θ, the wavelength λ of the monochromatic light L1 and the spacing d1 of the plurality of first diffraction elements 122 satisfy the inequality:

$$\frac{n\lambda}{2} \leq d1 \sin\theta,$$

and the n within the inequality is a positive integer. When the spacing d1 of the plurality of first diffraction elements 122 and the wavelength λ of the monochromatic light L1 are constant value, this inequality may be satisfied by varying the phase retardation angle θ of the monochromatic light L1.

The monochromatic light L1 which satisfies the inequality can produce the Bragg diffraction. In addition to the zero order diffraction, the first order of this diffraction has the highest diffraction efficiency. That is, the first order has the highest light intensity, while the other orders of the diffraction exit from the first volume grating 120 in specific angles (e.g. the light exiting angle of the first order diffraction).

In the embodiment, the monochromatic light L1 passes through the transparent substrate 100 and enters the second volume grating 140 from the interface 140i which is located between the second volume grating 140 and the transparent substrate 100. As aforementioned, the wavelength λ of the monochromatic light L1 ranges from 380 nm to 780 nm. The second volume grating 140 has a refractive index n2 and a thickness T2. The refractive index n2, the thickness T2 and the spacing d2 between two of the plurality of second diffraction elements 142 adjacent to each other satisfies the inequality:

$$\frac{n2d2^2}{T2} \leq 2\pi\lambda.$$

In the embodiment, the spacing d2 between two of the plurality of second diffraction elements 142 adjacent to each other ranges from 780 nm to 10000 nm. In other words, the spacing d2 satisfies the inequality: 780 nm≤d1≤10000 nm. On the other hand, the thickness T2 of the second volume grating 140 is less than 0.1 mm, while the thickness T2 of the second volume grating 140 is equivalent to the thickness of the plurality of second diffraction elements 142. The refractive index n2 of the second volume grating 140 ranges from 1.4 to 1.7. In addition, the refractive index n0 of the transparent substrate 100 also ranges from 1.4 to 1.7. It is worth mentioning, when the refractive index n2, the thickness T2 of the second volume grating 140 and the spacing d2 between two of the plurality of second diffraction elements 142 adjacent to each other are limited to aforementioned ranges, the thickness T2 of the second volume grating 140 must be less than 0.1 mm to satisfy the inequality:

$$\frac{n2d2^2}{T2} \leq 2\pi\lambda.$$

In various embodiments of the disclosure, the spacing d2 between two of the plurality of second diffraction elements 142 adjacent to each other is less than 27 times of the spacing d1 between two of the plurality of first diffraction elements 122 adjacent to each other (i.e. d2≤27×d1). Although the values of the characteristics (e.g. the thicknesses, the refractive indexes and the spacing between diffraction elements) of the first volume grating 120 and the second volume grating 140 in this embodiment are limited to the aforementioned ranges, the disclosure is not limited to those ranges. In other embodiments, the values of the characteristics of the first volume grating 120 and the second volume grating 140 may be beyond those aforementioned ranges.

It is worth mentioning, in various embodiments of the disclosure, the refractive index n1 of the first volume grating 120 is higher than the refractive index n0 of the transparent substrate 100, while the refractive index n0 of the transparent substrate 100 is higher than the refractive index n2 of the second volume grating 140.

The transparent substrate 100 includes polymer materials which can be transmitted by visible light, such as polythene terephthalate (PET) or similarity thereof. In addition, the first volume grating 120 and the second volume grating 140 include polymer materials which are thermosetting or photo curable and can be transmitted by visible light, such as UV curing adhesives or epoxy.

Referring to FIG. 2A and FIG. 3, each of the plurality of first diffraction elements 122 is a convex semicircular structure (i.e. a hemispherical structure) spaced from each other. Since the plurality of first diffraction elements 122 of the first volume grating 120 are coplanar and are substantially identical in geometry and size, the distance between the vertex 122v of two adjacent hemispherical structures is equal to the spacing d1 between the plurality of first diffraction elements 122 adjacent to each other. It is worth mentioning, the structures of the plurality of first diffraction elements 122 are not limited to the embodiment but may be other convex structures or concave structures in other shapes. For example, the plurality of first diffraction elements 122 may be pyramidal indentations spaced from each other.

Referring to FIG. 2B and FIG. 3, the second volume grating 140 further includes a plurality of concave surfaces 142x which are arranged in rectangular array and connected to each other. As shown in FIG. 2B, a plurality of convex sections 142p are formed on edges 142s of the plurality of concave surfaces 142x. Specifically, four of the plurality of convex sections 142p are located on the edges 142s of each of the plurality of concave surfaces 142x, while these four of the plurality of convex sections 142p are located separately on four corners of each edge 142s of one of the plurality of concave surfaces 142x. It should be mentioned that the plurality of convex sections 142p are partial of the plurality of second diffraction elements 142 of the second volume grating 140. That is, the plurality of second diffraction elements 142 includes the plurality of convex sections 142p.

It is worth mentioning, the plurality of convex sections 142p work as the diffraction elements to increase the light coherency, while the plurality of concave surfaces 142x are used to shield the dark fringes of the interference. For example, the light intensity of the constructive interference is normally distributed (in Gaussian distribution), and the plurality of concave surfaces 142x may widen the full width at half maximum (FWHM) of the light intensity which is normally distributed, so that the difference between the strongest intensity and the weakest intensity are decreased. In other words, the difference of light intensity between the constructive interference and the destructive interference (i.e. the light and dark fringes) are weakened to increase the light uniformity.

Since the plurality of second diffraction elements 142 of the second volume grating 140 are coplanar, the distance between two of the plurality of convex sections 142p adjacent to each other is equal to the spacing d2 between two of plurality of second diffraction elements 142 adjacent to each other. It is worth mentioning, the structures of the plurality of second diffraction elements 142 are not limited to the embodiment but may be other structures. For example, the plurality of concave surfaces 142x may be convex surfaces, and the plurality of second diffraction elements 142 may be indentations which are formed between the adjacent convex surfaces.

As shown in FIG. 3, in the embodiment, the thickness T1 of the first volume grating 120 is defined as the linear distance between the vertex 122v of the hemispherical structures and the interface 120i. The interface 120i is the interface between the transparent substrate 100 and the first volume grating 120. The thickness T2 of the second volume grating 140 is defined as the linear distance between the plurality of convex sections 142p and the interface 140i.

It is worth mentioning, the plurality of first diffraction elements 122 of the first volume grating 120 and the plurality of second diffraction elements 142 of the second volume grating 140 may be formed on the transparent substrate 100 by imprinting (or compression molding). For example, a layer of UV adhesives may be formed on the transparent substrate 100, and the layer of UV adhesives is compressed into hemispherical structures by compressing the molds, so that the plurality of first diffraction elements 122 of the embodiment are formed.

According to aforementioned embodiments, when the monochromatic light L1 passes through the first volume grating 120 of the optical component 10, different types of diffraction may be performed depending on different types of prerequisite. Specifically, both the first volume grating 120 and the second volume grating 140 make the light intensity of each order equal, so that the light uniformity of the optical component 10 reaches to 89.7%. Compared to optical components with diffusers whose light uniformity is 73.4%, the light uniformity of the optical component 10 is 16% higher.

In addition, the first volume grating 120 may produce Bragg diffraction, so that the diffraction efficiency of the specific diffraction (such as the first order diffraction) is increased, thereby the luminance of the optical component 10 reaches to 9243 nit. Compared to optical components with diffusers whose luminance is 9031 nit, the luminance of the optical component 10 is 2% higher.

Figure 4:
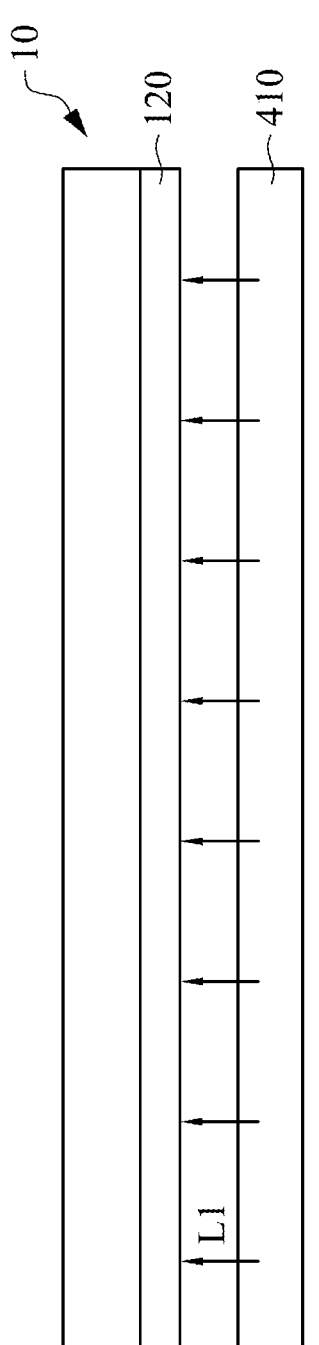
FIG. 4 illustrates a schematic side-view of a backlight module in accordance with at least one embodiment of the present disclosure.

Referring to FIG. 4, a backlight module 400 includes the aforementioned optical component, such as the optical component 10. In addition, the backlight module 400 further includes a monochromatic light source 410 which is used to emit the monochromatic light L1 toward the first volume grating 120. This monochromatic light source 410 may be a light-emitting devices which includes a light filter and light-emitting components, and the light-emitting components may be such as LEDs.

9
10

Figure 5:
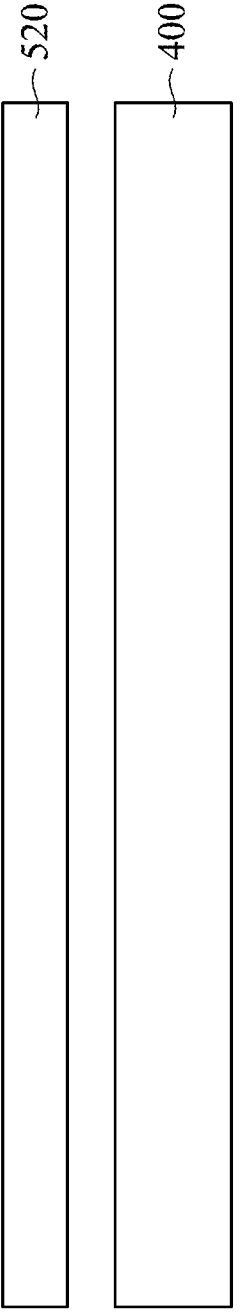
FIG. 5 illustrates a schematic side-view of a display device in accordance with at least one embodiment of the present disclosure.

Referring to FIG. 5, a display device 50 includes the backlight module 400 and a display panel 520. The display panel 520 is disposed opposite to the backlight module 400 and is located above the light exiting surface of the backlight module 400, so that the backlight module 400 can emit the light toward the display panel 520. The display panel 520 may be a transmissive display panel, such as a liquid crystal display panel which may have a quantum dot color filter (QDCF) substrate. Since the optical component 10 (not shown in FIG. 5) can make the monochromatic light L1 emitted from the monochromatic light source 410 emit uniformly and then increase the luminous efficiency (i.e. increase the luminance), the backlight module 400 and the display device 50 have the features of both high light uniformity and high luminance.

It is worth mentioning, optical lenses applied in geometric optics should coupling align lower light source with the geometric optical structure. Thus, the tolerance and assembly requirements are restricted. The disclosure is an optical component designed under principle of diffractive optics, so that the problem of optical coupling alignment during assembly to consider is unnecessary to be considered. Thus, the problems of lower luminous efficiency caused by alignment deviations can be reduced.

In conclusion, applying volume diffraction layers in optical components can improve the light uniformity and the luminance. Furthermore, the diffusers can be omitted since the optical component of the present disclosure has good light uniformity. Therefore, not only the cost of the optical films is saved, but the thickness of the optical components and material costs can be reduced.

Although the embodiments of the present disclosure have been disclosed as above in the embodiments, they are not intended to limit the embodiments of the present disclosure. Any person having ordinary skill in the art can make various changes and modifications without departing from the spirit and the scope of the embodiments of the present disclosure. Therefore, the protection scope of the embodiments of the present disclosure should be determined according to the scope of the appended claims.

What is claimed is:

1. An optical component comprising:
   a transparent substrate;
   a first volume grating disposed on the transparent substrate and comprising a plurality of first diffraction elements, wherein the plurality of first diffraction elements are arranged in rectangular array; and
   a second volume grating disposed on the transparent substrate, wherein the transparent substrate is located between the first volume grating and the second volume grating, and the second volume grating comprising a plurality of second diffraction elements, wherein the plurality of second diffraction elements are spaced from each other and arranged in rectangular array, and the spacing between two of the plurality of second diffraction elements adjacent to each other is larger than the spacing between two of the plurality of first diffraction elements adjacent to each other;
   wherein a monochromatic light having a wavelength $\lambda$ ranging from 380 nm to 780 nm enters the first volume grating having a refractive index n1 and a thickness T1, and the spacing between two of the plurality of first diffraction elements adjacent to each other defined as d1 satisfies the inequality:

$$\frac{n1d1^2}{T1} \leq 2\pi\lambda.$$

2. The optical component of claim 1, wherein the spacing d1 between two of the plurality of first diffraction elements adjacent to each other satisfies the inequality: 380 nm$\leq$d1$\leq$780 nm.

3. The optical component of claim 1, wherein a phase retardation angle $\theta$ of the monochromatic light satisfies the inequality:

$$\frac{n\lambda}{2} \leq d1 \ sin\theta,$$

and the n within the inequality is a positive integer.

4. The optical component of claim 1, wherein the second volume grating having a refractive index n2 and a thickness T2, and the spacing between two of the plurality of second diffraction elements adjacent to each other defined as d2 satisfies the inequality:

$$\frac{n2d2^2}{T2} \leq 2\pi\lambda.$$

5. The optical component of claim 4, wherein the spacing d2 between two of the plurality of second diffraction elements adjacent to each other satisfies the inequality: 780 nm<d2$\leq$10000 nm.

6. The optical component of claim 4, wherein the spacing d2 between two of the plurality of second diffraction elements adjacent to each other is less than 27 times of the spacing d1 between two of the plurality of first diffraction elements adjacent to each other.

7. The optical component of claim 1, wherein a thickness of the first volume grating is less than 0.1 mm.

8. The optical component of claim 1, wherein a thickness of the second volume grating is less than 0.1 mm.

9. The optical component of claim 1, wherein a refractive index of the first volume grating is higher than a refractive index of the transparent substrate, and the refractive index of the transparent substrate is higher than a refractive index of the second volume grating.

10. The optical component of claim 1, wherein a refractive index of the transparent substrate, a refractive index of the first volume grating and a refractive index of the second volume grating range from 1.4 to 1.7.

11. The optical component of claim 1, wherein the plurality of first diffraction elements are coplanar.

12. The optical component of claim 1, wherein the plurality of second diffraction elements are coplanar.

13. The optical component of claim 1, wherein the second volume grating further comprising:
   a plurality of concave surfaces arranged in rectangular array and connected to each other, wherein a plurality of convex sections are formed on the edges of the plurality of concave surfaces, and the plurality of convex sections are identical to the plurality of second diffraction elements.

14. The optical component of claim 13, wherein four of the plurality of convex sections are located on the edges of each of the plurality of concave surfaces.

15. The optical component of claim 1, wherein each of the plurality of first diffraction elements is a convex structure or a concave structure.

16. A backlight module, comprising:

the optical component of claim 1; and a monochromatic light source configured to emit the monochromatic light toward the first volume grating.

17. A display device, comprising:

the backlight module of claim 16; and a display panel disposed opposite to the backlight module.

* * * * *